United States Patent [19]

Ristow et al.

[11] Patent Number: 4,977,659

[45] Date of Patent: Dec. 18, 1990

[54] TOOL FOR SEATING TUBING IN A CONCEALED ROOFING BASE RAIL

[76] Inventors: Delano H. Ristow, 10015 Steinthal Rd., Kiel, Wis. 53042; Daniel B. Ristow, 14341 Riverton Cir., Westminster, Calif. 92683

[21] Appl. No.: 458,949

[22] Filed: Dec. 29, 1989

[51] Int. Cl.⁵ ............................................ B23P 19/02
[52] U.S. Cl. ...................................................... 29/235
[58] Field of Search ................. 29/450, 451, 235, 278, 29/243.57; 404/87, 74; 140/109; 425/458, 87

[56] References Cited

U.S. PATENT DOCUMENTS

| | | | |
|---|---|---|---|
| 3,487,799 | 1/1970 | Gronlund | 29/243.57 |
| 4,169,305 | 10/1979 | Kruszord | 29/235 |
| 4,477,969 | 10/1984 | Cabaud | 29/235 |
| 4,738,562 | 4/1988 | Howsley | 29/235 |
| 4,780,943 | 11/1988 | Angelo et al. | 29/235 |

*Primary Examiner*—Robert C. Watson

*Attorney, Agent, or Firm*—Foley & Lardner

[57] ABSTRACT

A tool for seating tubular members in grooves provided on each side of a base rail which is mounted on a supporting roof structure to secure the sheathing material for the roof covering the supporting roof structure to the base rail. The tool includes a frame having a first and second section. A wheel assembly is provided on both the front and back of said sections for supporting the frame for movement on the supporting roof structure. A housing is mounted on each section of the frame with a guide mounted on each housing on each side of the base rail for aligning the tubular members in the grooves in the base rail. The tubular members are seated in the grooves by rollers provided on each side of the base rail. The rollers being provided with grooves which correspond to the curvature of the center portion of the base rail and a drive motor for simultaneously rotating the rollers for driving the tool along the base rail.

15 Claims, 5 Drawing Sheets

TOOL FOR SEATING TUBING IN A CONCEALED ROOFING BASE RAIL

BACKGROUND OF THE INVENTION

1. Field of the Invention

This invention relates to a tube setting tool for securing flat roof sheathing materials to a base rail and more particularly to an automatic tube setting tool for seating tubular members in the grooves of the base rail with the sheathing material sandwiched between the tube and the groove of the base rail 2. Description of the Prior Art Sheathing material used to cover flat roofs must be secured to the roof at spaced intervals to prevent wind uplift. Hold down rails of the type contemplated herein are described in my U.S. Pat. No. 4,519,172 issued on May 28, 1985 entitled Water Proof Roof. The hold down rails described therein comprise an elongate base rail having a raised central portion, the base rail being secured to the roof. The roof is covered with a sheath material which also covers the base rail. A second member having the same shape as the raised portion of the base rail is mounted on the base rail for securing the sheathing material to the roof. The second member is attached to the base rail by fastening members such as screws which engage the underlying roof structure.

SUMMARY OF THE PRESENT INVENTION

The present invention relates to an improved hold down device of the type described in my U.S. patent application Ser. No. 07/232,026 entitled Water Proof Roof, the specification of which is incorporated herein by reference. In this device the base rail includes grooves or channels on each side of the raised center portion. The roofing material covers the supporting roof structure and the base rail. The roofing material is secured to the base rail by tubes or cables which are forced into the grooves on each side of the base rail to sandwich the roofing material between the base rail and the cables. The cables are manually aligned with the channels and forced into the channels to hold the sheathing material on the roof.

More specifically, the present invention relates to a tool which is used to automatically align and seat the tubes or cables in the grooves on each side of the raised center portion of the base rail to secure the roofing material to the roof. The tool includes rollers at the front and back which straddle the base rail and support the tool for movement along the base rail. The tool is provided with aligning guides and setting rollers for gradually feeding and seating the tubing into the grooves as the tool moves along the length of the base rail. An ordinary drill can be used to drive the tool along the base rail or the tool can be manually pushed along the base rail.

One of the principal features of the invention is the ability to automatically seat the tubes in the grooves of the base rail as the tool moves along the base rail and thereby secure the elastic sheathing member to the roof structure.

Another principal feature of the invention is the provision of a tool which is simple to operate and automatically seats the tubular members in the base rail grooves.

Another principal feature of the invention is the provision of a tool for securing an elastic sheathing member to a supporting roof structure which automatically takes up slack in the elastic sheathing member.

One of the principal advantages of the present invention is the reduction in time and labor required secure an elastic sheathing member to the base rail on a supporting structure.

Other features and advantages of the invention will become apparent to those skilled in the art upon review of the following drawings, the detailed description and the appended claims.

DETAILED DESCRIPTION OF THE DRAWINGS

Figure 1:
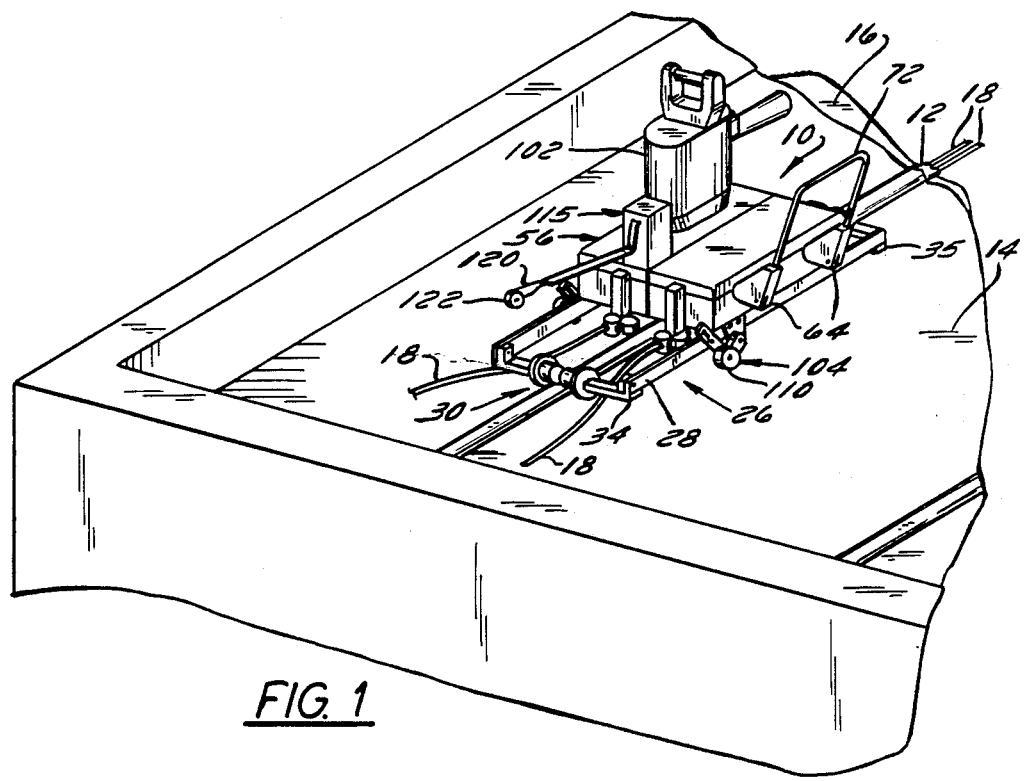
FIG. 1 is a perspective view of the tube setting tool shown straddling the base rail.

Before explaining at least one embodiment of the invention in detail it is to be understood that the invention is not limited to the application to the details of construction and the arrangement of the components set forth in the following description or illustrated in the drawings. The invention is capable of other embodiments or being practiced or carried out in various ways. Also, it is to be understood that the phraseology and terminology employed herein is for the purposes of description and should not be regarded as limiting.

DETAILED DESCRIPTION OF THE PREFERRED EMBODIMENTS

As shown in FIG. 1 the tube setting tool 10 is shown mounted on a base rail 12. A waterproof sheathing material 14 overlies the supporting roof structure 16 and the base rail 12. The tube setting tool 10 is used to seat tubular members 18 in the grooves 20 on each side of the base rail 12. The sheathing material being sandwiched in the groove between the tubular member and the base rail. It should be noted that tubular members as used herein refers to members either solid or hollow made of plastic or nylon material or cables covered by elastomeric material.

Figure 10:
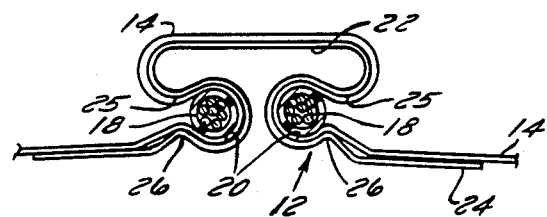
FIG. 10 is a view of the hold down assembly having the cables fully seated in the grooves of the base rail.

Referring to FIG. 10 a cross section view is shown of the base rail 12 which includes a raised center section 22 having flanges 24 extending outwardly of the center section 22 to support the rail on the roof structure. Grooves 20 are formed in the side walls of the center section 22. Ridges 26 are provided in the supporting flanges 24 at the entrance to the grooves in the base rail. The overhanging edges 25 of the center section are spaced from the ridges 26 of the center section a distance substantially equal to but less than the diameter of the tubular members 18. The sheathing material 14 covers the center section 22 of the base rail. The sheathing material 14 is secured to the base rail 12 by means of the tubular members 18 which are inserted into the grooves 20 to sandwich the sheathing material between the tubular members 18 and the center section 22 of the base rail.

In accordance with the invention the tool 10 includes a frame 56 formed from two half sections 56A and 56B. Each half section includes a side rail 28A and 28B, respectively. A wheel assembly 30 is mounted at the front end of the side rails 28A and 28B and a wheel assembly 32 is mounted on the back end of the side rails 28A and 28B for supporting the frame 56 for movement with respect to the base rail 12. In this regard, the two front wheel assemblies 30 each include a support block 34 which is secured to the corresponding side rail 28A or 28B by bolts 36. Each block 34 includes a shaft 38 for supporting a wheel 40. Each of the wheels 40 having a flange 42 for supporting the frame on the supporting roof structure. The two rear wheel assemblies 32 also include a support block 35 which is secured to the corresponding side rails 28A or 28B by bolts 37. Each block 35 includes a shaft 39 for supporting a wheel 41. Each wheel 41 includes a flange 43 for supporting the rear of the frame 56.

The side rails 28A and 28B are mounted on housings 44A and 44B which support tube setting assemblies 46 and 48. Each housing 44A and 44B includes a side wall 50, a front end wall 52 and a rear end wall 54. The walls are enclosed at the top by means of a plate 56.

The two half sections 56A and 56B are connected by means of rods 58 which pass through holes 60 in the housings 44A and 44B. Lock nuts 62 are provided on one end of the rods 58. Means are provided at the other end of the rods 58 for opening and closing the two sections of the frame 56. Such means is in the form of cam plates 64 which are pivotally connected to the rods 58 by pins 66. Each of the cam plates 64 includes a groove 68 and a camming surface 70. The cam plates 64 are moved between open and closed positions by means of a handle 72 connected to each of the cam plates 64. The two sections of the frame are biased to an open position by means of a spring 74 which is seated in blind bores 76 provided in each of the housings 44A and 44B.

Figure 5:
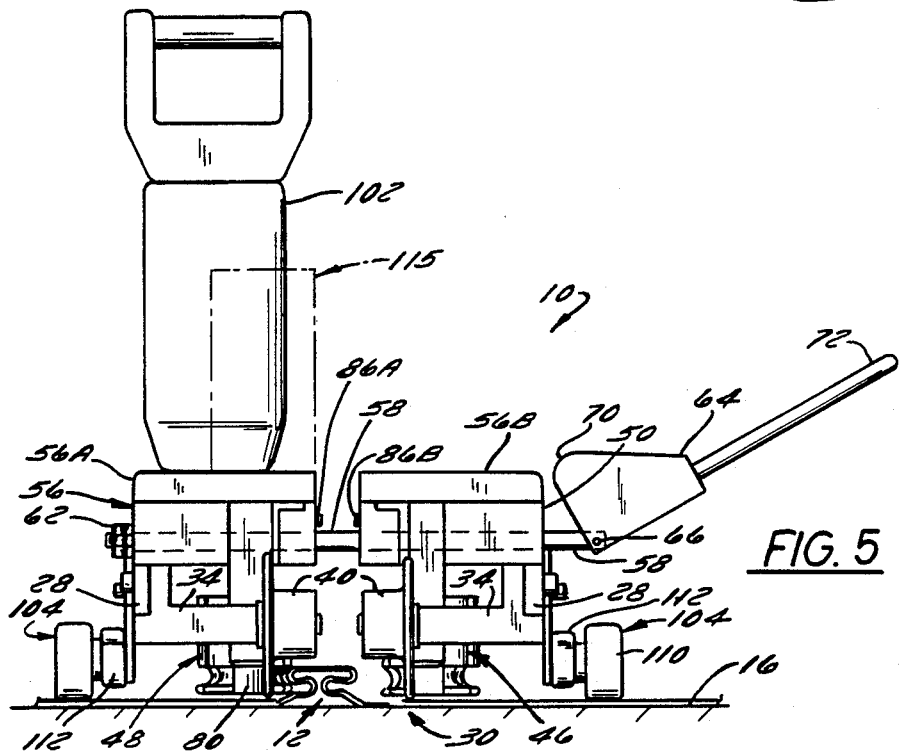
FIG. 5 is a front elevation view similar to FIG. 4 showing the tool in the open position.
Figure 2:
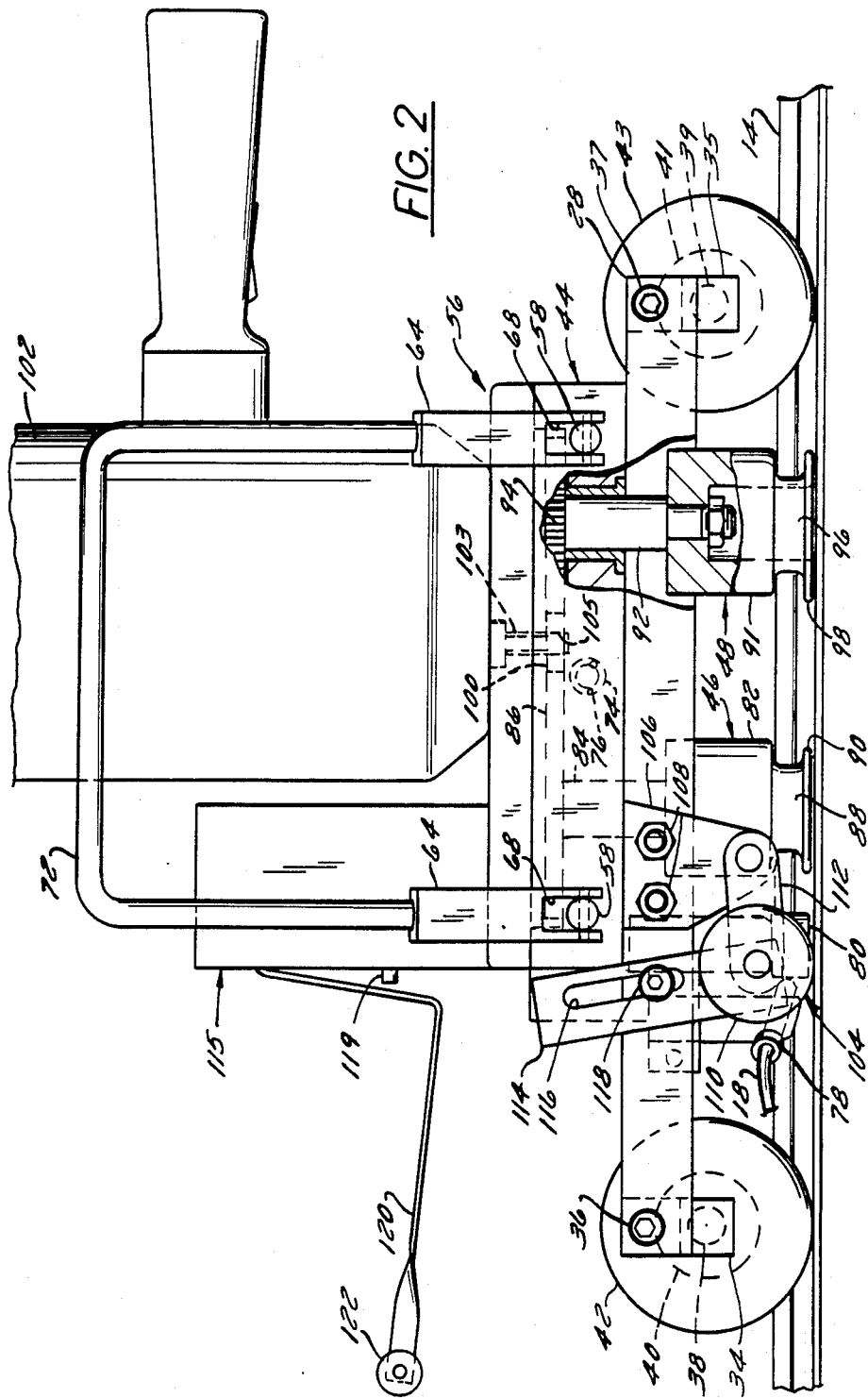
FIG. 2 is a side elevation view of the tube setting tool.
Figure 3:
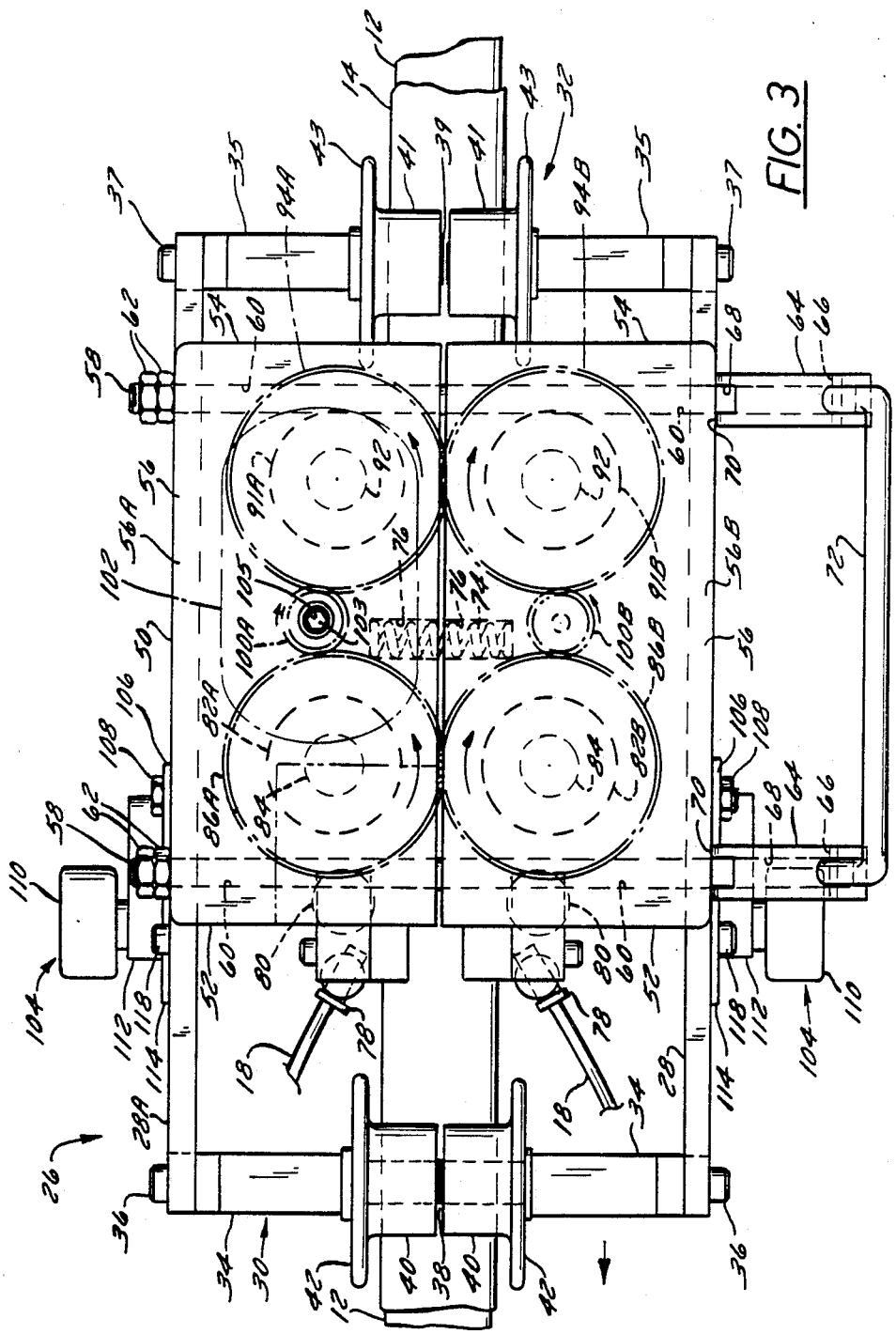
FIG. 3 is a top plan view of the tube setting tool.

Referring to FIG. 5 the two sections 56A and 56B of the frame 56 are shown in the open position and aligned with the base rail 12. The handle 72 is in the down position with the cam surfaces 70 in the up position.

Figure 4:
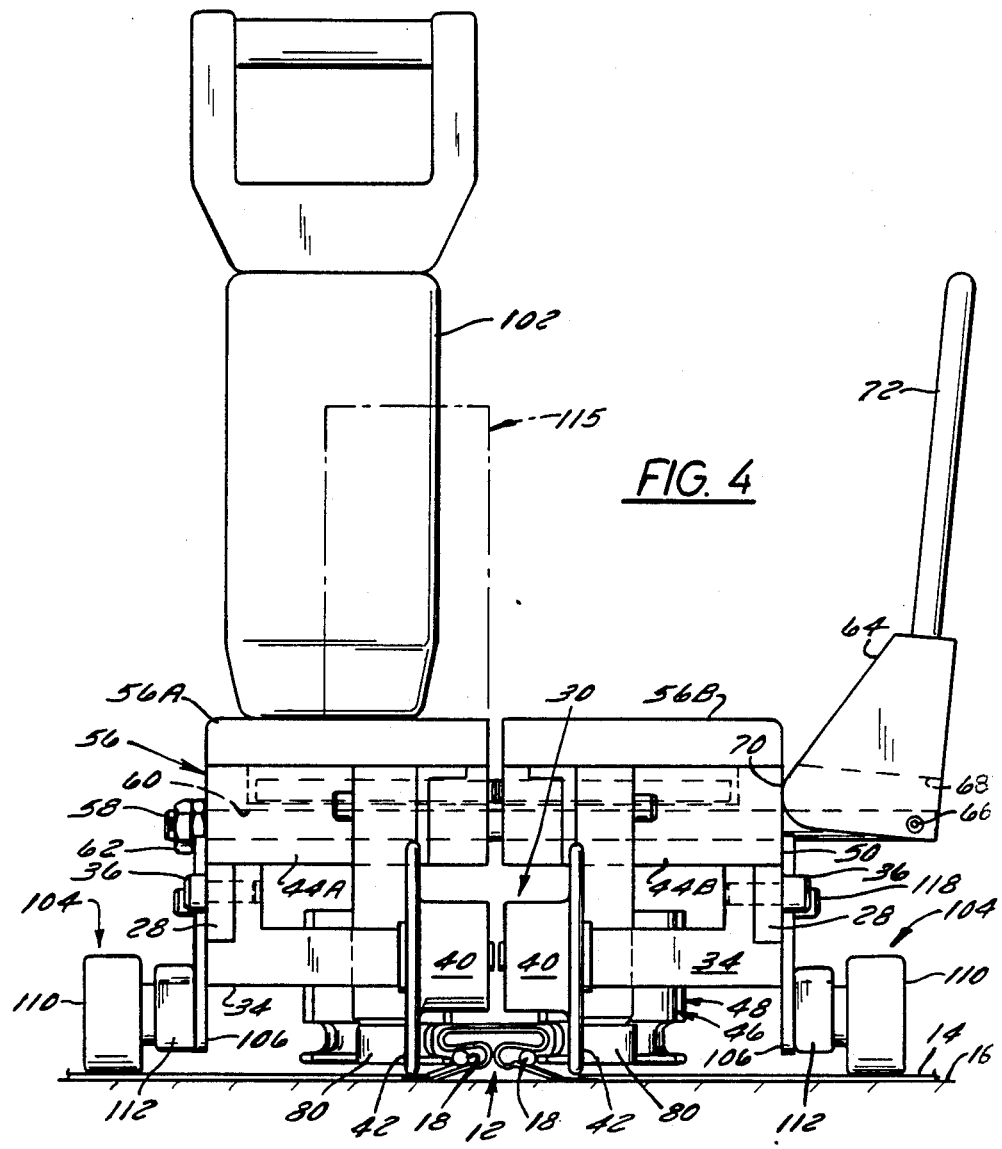
FIG. 4 is a front elevation view of the tube setting tool shown in a closed condition.
Figure 6:
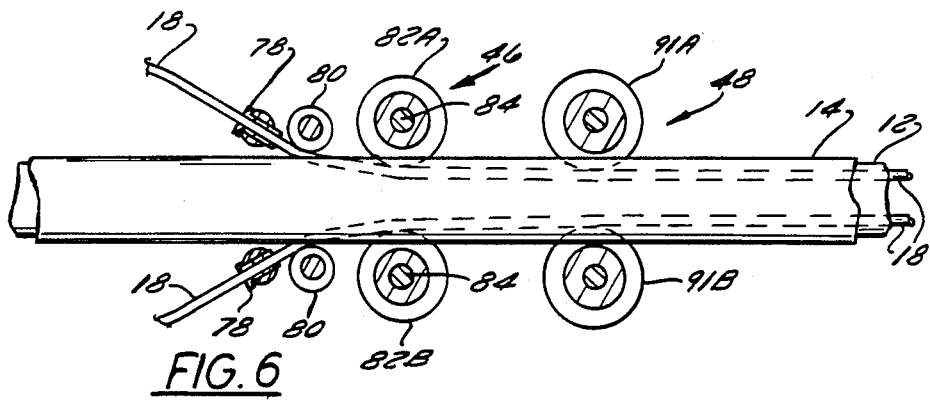
FIG. 6 is a schematic view showing the arrangement of the tube guide rolls and tube setting rolls.
Figure 7:
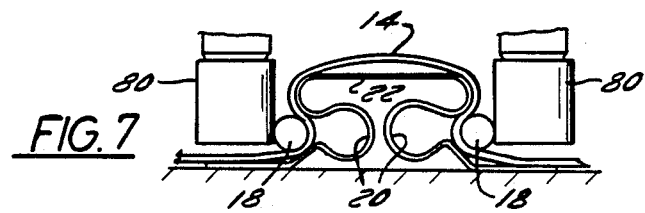
FIG. 7 is a view of the guide rolls.
Figure 8:
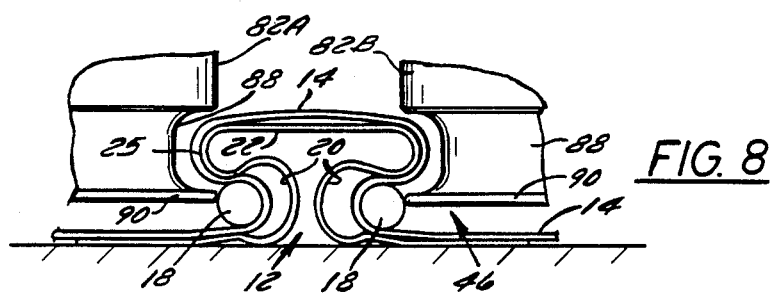
FIG. 8 is a view of the first set of setting rolls.
Figure 9:
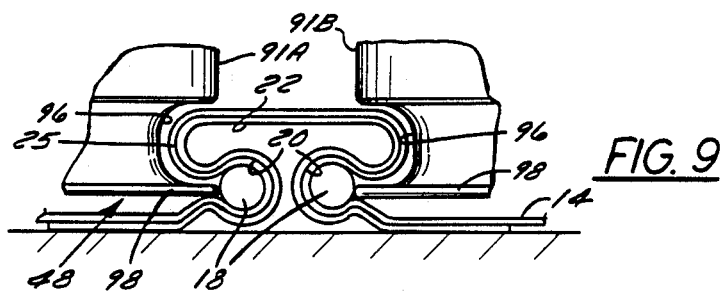
FIG. 9 is a view of the second set of setting rolls.

Referring to FIG. 4, the cams 64 are shown moved or pivoted to the closed position. The handle 72 is in the up position and the cam surfaces 70 in the down position in engagement with side walls 50. The flanges 42 and 43 of the rollers 40 and 41, respectively, are located on each side of the base rail 12.

Means are provided for guiding the tubular members 18 into the grooves 20 in the base rail 12. Such means is in the form of guide tubes 78 and guide rollers 80. The tubular members 18 are inserted into the guide tubes 78 far enough for the end of the members 18 to become wedged between a guide roller 80 and the sheathing material 14 overlying the center section 22. The guide rollers 80 are mounted to rotate freely as the tubular members 18 are drawn through the guide tube 78 into alignment with a groove 20.

In this regard it should be noted that the end of the tubular member 18 will engage the sheathing material 14 and on movement of the tool along the base rail 12, the frictional engagement of the rubberized sheathing material 14 with the tubular member 18 will pull the member into the adjacent groove 20. The guide rollers 80 rotate at the same speed as the tubular members 18 are drawn into the groove 20.

The tubular members are progressively seated into the grooves 20 by means of the cable seating assemblies 46 and 48. In this regard the front or first setting assembly 46 includes means in the form of a pair of tube seating rollers 82A, 82B mounted for rotary motion on shafts 84. Each tube seating roller 82 includes a gear 86 at the upper end and a groove 88 at the lower end which defines a flange 90 at the bottom of the roller. Groove 88 conforms to the shape of the edge 25 of the center section 22 of the base rail 12. The flanges 90 extend partway into the grooves 20 to partially force the tubular member 18 and sheathing material 14 into the groove 20. The second or rear set of tube seating rollers 48 also include a pair of rollers 91A and 91B mounted for rotary motion on shafts 92. Each roller 91 having a gear 94 at the top and a groove 96 at the lower end defining a flange 98. The grooves 96 conforming to the shape of the edges 25 of the center sections 22. When the frame half sections 56A and 56B are closed the gears 86A and 94A will mesh with the corresponding gears 86B and 94B.

The rollers 82 and 91 are rotated by means of pinion gears 100A and 100B. The pinion gear 100A being mounted between the gears 86A and 94A on the rollers 82A and 91A, respectively. The pinion gear 100B is mounted in the housing between the gears 86B and 94B on the rollers 82B and 91B, respectively. It should be noted that the gears 86 on rollers 82, the gears 94 on the rollers 90 and the pinion gears 100 will form a complete drive train when the frame members 56A and 56B are closed.

One of the pinion gears 100 is driven by means of a drill 102 mounted on top of the frame member 56A. The drill 102 is provided with a hexagonal shaft 103 which matingly engages a corresponding opening 105 in the pinion gear 100A. Rotation of the pinion gear 100 by the drill 102 will rotate all of the rollers at the same speed. The rotary motion of the rollers will move the tool along the base rail due to the engagement of the rollers with the sheathing material that overlies the base rail.

Means are provided for stabilizing the tool as it moves along the base rail. Such means is in the form of side roller assemblies 104. Each side roller assembly including a bracket 106 secured to the side rails 28 by bolts 108. Rollers 110 are mounted on, one end of an arm 112, which has the other end pivotally connected to the bracket 106. A strap 114 having an elongate slot 116 has one end pivotally connected to the one end of the arm 112. The strap 114 is secured to the side rail 28 by means of a bolt 118 which is aligned with slot 116. The position of the roller 110 can be adjusted by loosening bolt 118 so that the strap 114 can be moved up or down within the limits of the elongate slot 116.

A shut off switch assembly 115 can be provided on the front of the tool for turning off the drill when the tool reaches or engages an obstruction such as a wall at the end of the roof structure. Such means is in the form of a switch 119 and an actuating arm 120 pivotally mounted on the housing. A roller 122 is provided at the end of the arm 120 which extends forward just slightly from the front rollers 42. On engagement of the roller 132 with an obstruction, the roller will move backward pivoting the arm 120 downward to close the switch 119 to turn off the drill.

Although the tool has been described as driven by motor 102, it is also within the contemplation of this invention to manually push the tool along the base rail to seat the tubular member 18 into the grooves. The tool also can be used to deform the legs of a clamp plate as shown in my copending application Ser. No.

07/254,972 filed on Oct. 7, 1988 entitled "Clamp on Rubber Roof Support" and incorporated in this application by reference. The legs are deformed into the grooves in the center section of the base rail to sandwich the sheathing material in the grooves.

Thus, it should be apparent that there has been provided in accordance with the present invention a tube setting tool for seating a roof sheathing material to a base member that fully satisfies the aims and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A tool for seating sheathing material covering a supporting roof structure in the grooves on each side of a base rail mounted on the supporting roof structure to secure the sheathing material to the base rail, said tool comprising a frame divided into a first section and a second section, a wheel mounted on the front and back of each of said sections for supporting the frame for movement on the supporting roof structure, a housing mounted on each section of said frame, guide means mounted on the frame on each side of the base rail for aligning the tubular members with the grooves on each side of the base rail, means mounted in each of said housings for seating the tubular members in the grooves and means for driving the frame along the base rail whereby the tubular members are seated in the grooves as the tool moves along the base rail.

2. The tool according to claim 1 wherein said seating means includes at least one roller mounted on each side of said base rail for seating the tubular members into the grooves in the base rail.

3. The tool according to claim 1 wherein said guide means includes a roller mounted on each side of the base rail for guiding the tubular members into the grooves and a guide tube for feeding the tubular members into the roller.

4. The tool according to claim 3 including drive means mounted on said housing for simultaneously rotating said seating rollers.

5. The tool according to claim 4 including means for separating said sections for mounting on the base rail and closing said sections to align said guide rollers with the base rail.

6. A tool for seating sheathing material into the grooves provided on each side of a base rail mounted on a supporting roof structure, by forcing tubular members into the grooves to sandwich the sheathing material between the base rail and the tubular members, said tool comprising,
   a frame divided into two half sections, means for opening said half sections to straddle the base rail and closing said half sections on said base rail to support each half section for movement on the roof structure,
   guide means mounted on each frame section for aligning the tubular members into the grooves in the said half sections,
   means mounted on each frame section for seating the sheathing material and tubular members in the grooves,
   and drive means mounted on one of said frame sections for driving said seating means to move said tool along the base rail.

7. The tool according to claim 6 wherein said seating means comprises a pair of rollers, each roller including a groove around said roller having a shape conforming to the shape of the base rail and forming a flange which is aligned with the groove in the base rail.

8. The tool according to claim 7 wherein each half section includes a gear means for driving said rollers, said gear means in one half section meshing with the gear means in the other half section when said half sections are closed whereby each roller is driven at the same speed.

9. The tool according to claim 6 including a side roller assembly outboard of each half section for stabilizing said frame.

10. A tool for securing roof sheathing material to a base rail mounted on a supporting roof structure by seating a tubular member in a groove in the base rail to sandwich the sheathing material between the groove in the base rail and the tubular member, said tool comprising,
    a frame having two sections, means for supporting said sections on the sheathing material on the roof structure for movement with respect to the base rail,
    a guide roller mounted on each section for guiding the tubular member into the groove in the base rail, and means mounted on each section for seating the tubular member into the groove in the base rail.

11. The tool according to claim 10 including means for driving said seating means to move said frame along the length of the base rail.

12. The tool according to claim 10 including means for opening said sections to straddle the base rail and closing said sections to align said guide roller and said seating means with the grooves in the base rail.

13. A tool for seating a tubular member in the grooves of a base rail to sandwich a roof sheathing material in the groove between the tubular member and the base rail, said tool comprising,
    a frame having two sections, means mounted on said frame for opening and closing said sections, means for supporting said frame for movement on a supporting roof structure, means mounted on said frame for guiding the tubular members into the grooves in the base rail,
    a set of rollers for seating said tubular member in the grooves in the base rail, and means for closing said sections to align said rollers with said grooves.

14. The tool according to claim 12 wherein said guiding means includes a guide tube for directing the tubular member into the groove in the base rail and a guide roller for initially aligning the tubular member in the groove.

15. The tool according to claim 14 including means for driving said frame along the base rail.

* * * * *